(12) United States Patent
Piotrowski et al.

(10) Patent No.: US 8,678,148 B2
(45) Date of Patent: Mar. 25, 2014

(54) DUAL SPRING VARIABLE VALVING SYSTEM

(75) Inventors: Lukasz Piotrowski, Cracow (PL);
Radoslaw Kuc, Cracow (PL); Marcin Knapczyk, Cracow (PL)

(73) Assignee: Beijing West Industries, Co., Ltd., Beijing (CN)

( * ) Notice: Subject to any disclaimer, the term of this patent is extended or adjusted under 35 U.S.C. 154(b) by 9 days.

(21) Appl. No.: 13/511,105

(22) PCT Filed: Nov. 23, 2010

(86) PCT No.: PCT/US2010/057790
§ 371 (c)(1),
(2), (4) Date: Sep. 26, 2012

(87) PCT Pub. No.: WO2011/063390
PCT Pub. Date: May 26, 2011

(65) Prior Publication Data
US 2013/0008750 A1    Jan. 10, 2013

Related U.S. Application Data

(60) Provisional application No. 61/263,513, filed on Nov. 23, 2009.

(51) Int. Cl.
*F16F 9/46*    (2006.01)
(52) U.S. Cl.
USPC .................. 188/266.5; 188/282.2; 188/299.1

(58) Field of Classification Search
USPC ........... 188/266.2, 266.5, 282.2, 282.5, 299.1
See application file for complete search history.

(56) References Cited

U.S. PATENT DOCUMENTS

| | | | | |
|---|---|---|---|---|
| 4,183,509 | A | * | 1/1980 | Nishikawa et al. ........... 267/218 |
| 4,463,839 | A | * | 8/1984 | Ashiba ........................ 188/282.4 |
| 4,635,765 | A | * | 1/1987 | Schmidt ...................... 188/266.3 |
| 5,507,371 | A | | 4/1996 | Takahashi |
| 5,522,484 | A | * | 6/1996 | Sawai .......................... 188/282.2 |
| 6,915,885 | B2 | * | 7/2005 | Forster ........................ 188/266.3 |
| 7,017,719 | B2 | * | 3/2006 | Forster ............................ 188/314 |
| 2008/0099968 | A1 | | 5/2008 | Schroeder |
| 2009/0020382 | A1 | | 1/2009 | Van Weelden et al. |

* cited by examiner

*Primary Examiner* — Christopher Schwartz
(74) *Attorney, Agent, or Firm* — Dickinson Wright PLLC

(57) ABSTRACT

A shock absorber having a cylindrically shaped housing including a piston dividing the housing into a compression chamber and a rebound chamber. The piston presents a plurality of apertures for allowing oil to flow between the compression and rebound chambers. A rebound resilient disc is disposed in the compression chamber for obstructing the flow of oil from the rebound chamber to the compression chamber. A two-spring adjustable valving system is disposed in the compression chamber for extorting a biasing force against the rebound resilient disc. A sleeve extends between the first and second springs to interconnect the first and second springs. An actuator is connected to the second spring through a spindle for selectively compressing or expanding the second spring to adjust the biasing force on the rebound resilient disc.

15 Claims, 2 Drawing Sheets

025 # DUAL SPRING VARIABLE VALVING SYSTEM

CROSS REFERENCE TO RELATED APPLICATIONS

This application claims priority to International Patent Application No. PCT/US2010/057790 filed on Nov. 23, 2010, entitled "Dual Spring Variable Valving System" and U.S. Provisional Application No. 61/263,513 filed on Nov. 23, 2009 entitled "Hydraulic Damper".

BACKGROUND OF THE INVENTION

1. Field of the Invention

A shock absorber assembly including a fluid for absorbing forces between a first component and a second component.

2. Description of the Prior Art

Motor vehicles generally include a suspension system having a shock absorber, also known as a damper, for absorbing forces between the frame and the wheel assembly of the vehicle. Most shock absorbers have a cylindrically shaped housing extending along an axis and presenting an open interior. A piston is slidably disposed in the housing to divide the open interior into a compression chamber on one side of the piston and a rebound chamber on the other side of the piston. A rod engaging the piston extends through the piston housing for attachment to either the frame or the wheel assembly of the vehicle, and the housing is attached to the other of the frame or the wheel assembly. The piston presents a plurality of apertures for conveying a fluid in the housing between the rebound and compression chambers in response to movement of the wheel assembly relative to the frame. Because the fluid must pass through the small apertures of the piston, a damping force is developed by the shock absorber to resist movement of the wheel assembly relative to the frame of the vehicle. It is well known that shock absorbers having a high damping force generally offer better vehicle performance, whereas shock absorbers having a low damping force generally offer better passenger comfort. It is well known that shock absorbers having a high damping force generally offer better vehicle performance, whereas shock absorbers having a low damping force generally offer better passenger comfort.

Various methods have been developed for adjusting the level of damping of shock absorbers to affect the dynamic characteristics of the vehicle. One example of such an adjustable shock absorber is shown in U.S. Pat. No. 5,507,371, issued to Koukichi Takahashi on Apr. 16, 1996 ("Takahashi '371"). Takahashi '371 shows an adjustable shock absorber including a valve on one side of the piston that deforms in a deflecting manner to impede the flow of fluid through the apertures of the piston. A spring is disposed on the other side of the damping valve to exert a biasing force on the damping valve. The spring is linked to an actuating rod for adjusting the biasing force being exerted by the spring on the damping valve. An adjustment of the biasing force against the damping valve ultimately affects the damping force of the shock absorber. There remains a continuing need for improved adjustable shock absorbers.

SUMMARY OF THE INVENTION AND ADVANTAGES

A shock absorber assembly including a resilient disc engaging the piston for impeding the passage of fluid through an aperture of the piston. A first spring is disposed in a housing for exerting a biasing force against the resilient disc. A second spring, which is spaced from the first spring, is disposed in the shock absorber and spaced from the first spring, and a sleeve extends between the first and second springs. An actuator is connected to the second spring for selectively expanding or contracting the second spring. The sleeve transfers forces from the adjustable second spring to the first spring to adjust the biasing force being exerted against the resilient disc, which ultimately affects the level of damping of the shock absorber assembly.

The shock absorber assembly is advantageous because, depending on the actuator chosen, it can quickly adjust to an infinite number of positions between pre-established stopping points. In other words, the damping force of the shock absorber can be adjusted to accommodate a wide range of damping settings. The level of damping can be quickly adjusted by the operator of the vehicle, even while the vehicle is in use.

Additionally, the two-spring design allows for very small and precise adjustments in the level of damping of the shock absorber, and very little energy is required to make those adjustments. In other words, small and efficient actuator is sufficient to adjust the level of damping of the shock absorber assembly.

Further, the two-spring design is very compact and can be added onto pre-existing shock absorbers, or the two-spring design could be used in conjunction with other valving systems. Moreover, any type of actuator can be used to adjust the level of damping of the shock absorber. Finally, each of the components of the shock absorber is either off the shelf or can be cheaply manufactured. Thus, the present invention delivers the adjustable performance of an expensive shock absorber for a low price.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
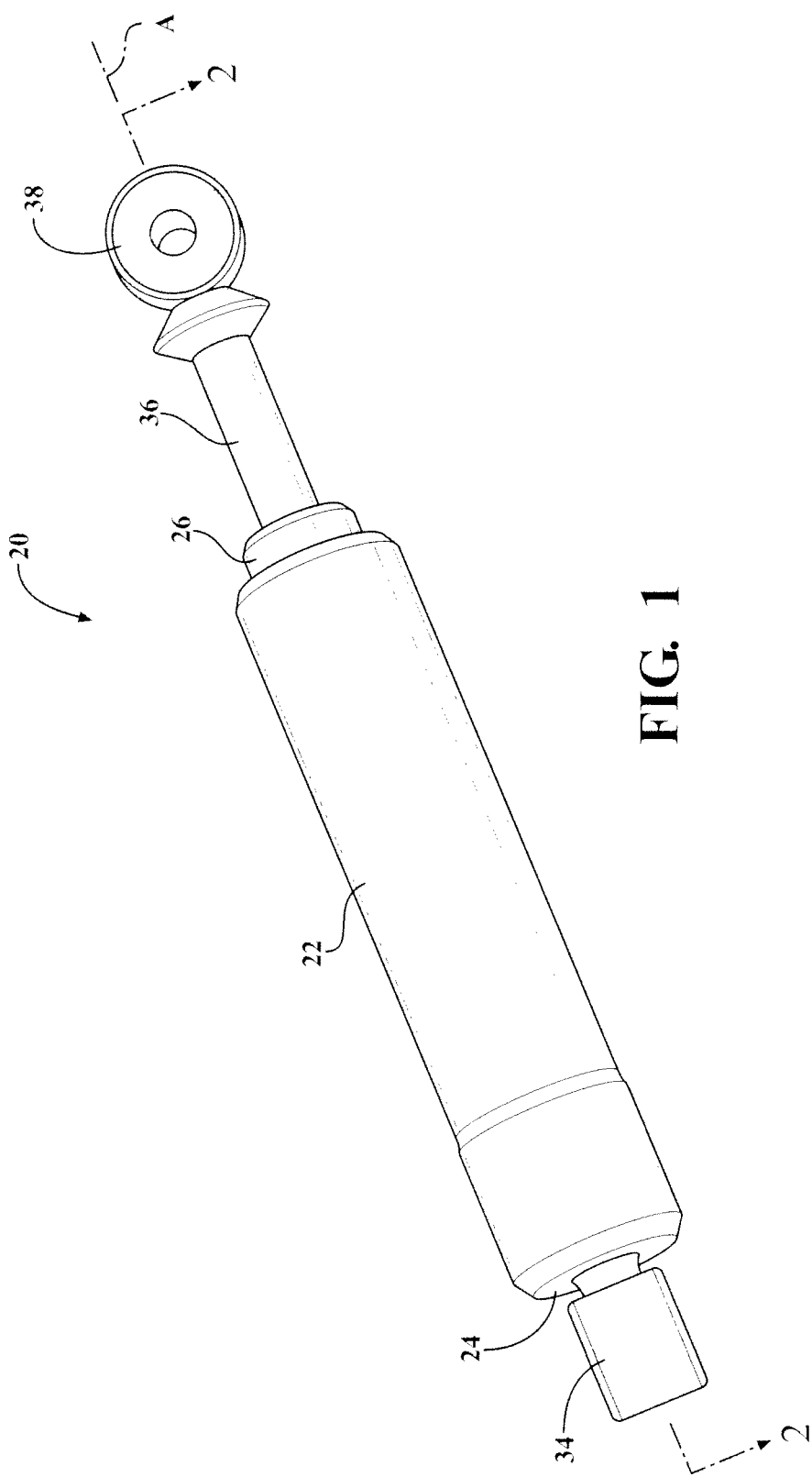
FIG. 1 is a perspective view of the exemplary embodiment of the subject embodiment.
Figure 2:
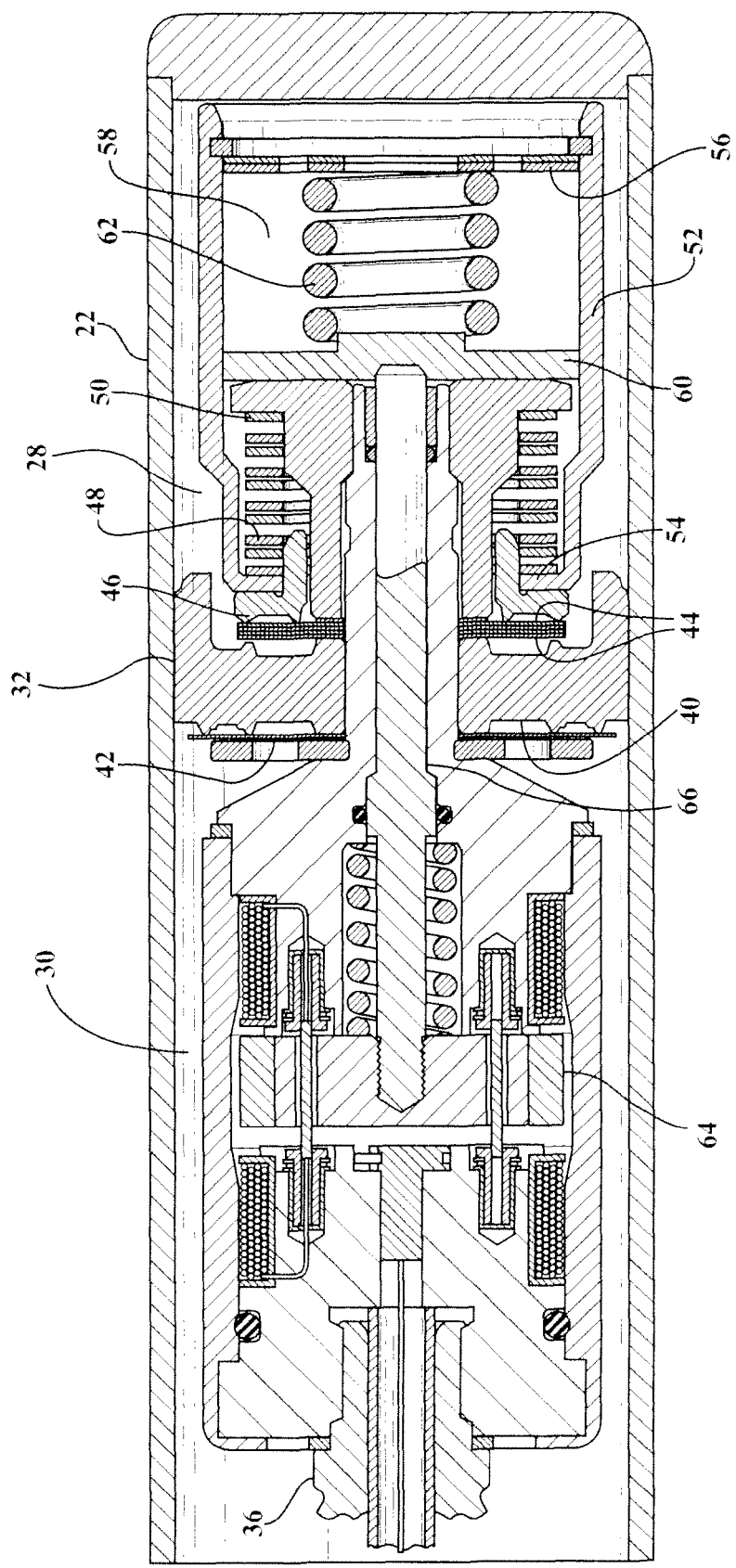
FIG. 2 is a cross-sectional view of the exemplary embodiment taken along line 2-2 of FIG. 1.

Referring to the Figures, wherein like numerals indicate corresponding parts throughout the several views, a shock absorber assembly 20 including a fluid for absorbing forces between a first component and a second component is generally shown in FIGS. 1 and 2. Although shown in the drawings as a mono-tube shock absorber, it should be appreciated that a twin-tube shock absorber could alternatively be used. The shock absorber assembly 20 could be used in many different applications, including but not limited to a motor vehicle, an all-terrain vehicle, or a snowmobile.

FIG. 2 is a cross-sectional view of the exemplary embodiment of the shock absorber assembly 20. The exemplary embodiment includes a housing 22 having a cylindrical shape and extending along an axis A from a first housing end 24 to a second housing end 26. The housing 22 also presents an open interior 28, 30, which contains the fluid. The fluid is preferably an oil, though any other fluid may alternatively be used.

A piston 32 is slidably disposed in the open interior 28, 30 of the housing 22 for sliding in an axial direction. The piston 32 divides the open interior 28, 30 of the housing 22 into a compression chamber 28 on one side of the piston 32 and a rebound chamber 30 on the other side of the piston 32.

A first connector 34 is disposed on the first housing end 24 for attachment to the first component, e.g. the frame of an automobile. A rod 36 interconnected with the piston 32 extends along the axis A through the second housing end 26 to a second connector 38 for attachment to the second component, e.g. the wheel assembly of an automobile.

The piston 32 presents a plurality of apertures 40 for conveying the oil through the piston 32 between the compression and rebound chambers 28, 30 in response to movement of the second component (wheel assembly) relative to the first component (frame), or vice versa. A compression resilient disc 42 is disposed in the rebound chamber 30 of the housing 22 and abutting the piston 32 for impeding the flow of oil through the apertures 40 of the piston 32 from the compression chamber 28 to the rebound chamber 30 during a compression stroke of the piston 32. During the compression stroke of the piston 32, the pressure of the oil in the compression chamber 28 increases relative to the rebound chamber 30. The compression resilient disc 42 is preferably formed of a resilient material such as spring steel for deflecting to open the apertures 40 to allow the oil to flow through the apertures 40 only in response to a threshold pressure difference between the oil in the compression chamber 28 and the rebound chamber 30.

The exemplary embodiment further includes a plurality of rebound resilient discs 44 secured to the piston 32 in the compression chamber 28. A first fixed spring seat 46 abuts the rebound resilient discs 44, and a first spring 48 exerts a biasing force on the first fixed spring seat 46 and the rebound resilient discs 44 to normally close the apertures 40 of the piston 32. The other end of the first spring 48 engages a second fixed spring seat 50, which is spaced axially from the first fixed spring seat 46 and fixed to the piston 32.

During the rebound stroke of the piston 32, the fluid pressure in the rebound chamber 30 rises relative to the fluid pressure in the compression chamber 28. Once the fluid pressure in the rebound chamber 30 exceeds the fluid pressure in the compression chamber 28 by a threshold amount, the rebound resilient discs 44 deflect, or move against the bias exerted by the first spring 50, to open the apertures 40 of the piston 32 and allow the oil to flow from the rebound chamber 30 to the compression chamber 28. Thus, the deflection of the rebound resilient discs 44 is determined, at least in part, by the biasing force being exerted on the rebound resilient discs 44 by the first spring 48.

A sleeve 52 having a generally tubular shape is disposed in the compression chamber 28 of the housing 22. One end of the tubular sleeve 54 presents an annular lip 56, which is positioned between the first spring 48 and the first fixed spring seat 46. The tubular sleeve 52 extends from the annular lip 54 past the first spring 48 to a first adjustable spring seat 56, which is spaced axially from the second fixed spring seat 50. The tubular sleeve 52 presents an open-ended cavity 58 between the second fixed spring seat 50 and the first adjustable spring seat 56, and the open-ended cavity 58 opens into the compression chamber 28.

A second adjustable spring seat 60 is disposed in the open-ended cavity 58 between the second fixed spring seat 50 and the first adjustable spring seat 56. The second adjustable spring seat 60 normally abuts the second fixed spring seat 50. A second spring 62 extends between the first and second adjustable spring seats 56, 60 for exerting a biasing force against the tubular sleeve 52.

The exemplary embodiment further includes an actuator 64 disposed in the rebound chamber 30. The actuator 64 is connected to a spindle 66 for moving the spindle 66 in an axial direction. The spindle 66 extends axially through the piston 32 to engage the second adjustable spring seat 60 for moving the second adjustable spring seat 60 in the axial direction within the open-ended cavity 58. The actuator 64 of the exemplary embodiment is a bi-stable solenoid actuator 64. However, it should be appreciated that any other actuator may be used to move the spindle 66, including but not limited to a stepper motor, a manually operated actuator, a pneumatic actuator, or an electric actuator. The bi-stable solenoid actuator 64 of the exemplary embodiment can only shift the second adjustable spring seat 60 between two stable positions. However, depending on the actuator chosen, the second adjustable spring seat 60 may be adjustable to an infinite number of positions between two established stopping points, with one of the established stopping points being the second fixed spring seat 50.

Movement of the second adjustable spring seat 60 through the spindle 66 changes the biasing force exerted on the sleeve 52 by the second spring 62. This biasing force is imparted on the first spring 48 through the lip 54 of the sleeve 52 to negate some of the biasing force exerted by the first spring 48 on the rebound resilient discs 44. In other words, compressing the second spring 62 by moving the second adjustable spring seat 60 ultimately reduces the biasing force on the rebound resilient discs 44.

In operation, to reduce the level of damping of the shock absorber assembly 20, the actuator 64 is activated to move the spindle 66 and the second adjustable spring seat 60 axially toward the first adjustable spring seat 56. This compresses the second spring 62, causing it to exert an increased a biasing force against the sleeve 52. Because the first spring 48 is connected to the sleeve 52 through the annular lip 54, the increased biasing force against the sleeve 52 subtracts some of the biasing force being exerted by the first spring 48 on the rebound resilient discs 44. With a decreased biasing force, less pressure is required to deflect the rebound resilient discs 44, and thus, the level of damping of the shock absorber assembly 20 is reduced. The level of damping of the shock absorber assembly 20 can restored by activating the actuator 64 to move the second adjustable spring seat 60 back toward the second fixed spring seat 50.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A shock absorber assembly including a fluid for absorbing forces between a first component and a second component comprising:

a housing extending along an axis and presenting an open interior, a piston slidably disposed in said open interior of said housing and defining a compression chamber on one side of said piston and a rebound chamber on the other side of said piston, said piston presenting at least one aperture for conveying the fluid through said aperture of said piston between said compression and rebound chambers, a resilient disc engaging said piston for impeding the passage of fluid through said aperture of said piston,
a first spring engaging said resilient disc for exerting a biasing force against said resilient disc,
a second spring,
an actuator for selectively compressing and expanding said second spring, and
a sleeve engaging said first spring and said second spring for adjusting said first spring in response to said selective compression and expansion of said second spring.

2. The shock absorber assembly as set forth in claim 1 further including a first fixed spring seat disposed between said first spring and said resilient disc for receiving said first spring and for transferring said biasing force from said first spring to said resilient disc.

3. The shock absorber assembly as set forth in claim 2 wherein said sleeve presents an inwardly extending annular lip positioned between said first spring and said first fixed spring seat.

4. The shock absorber assembly as set forth in claim 3 wherein said sleeve has a generally tubular shape.

5. The shock absorber assembly as set forth in claim 3 wherein said sleeve extends from said annular lip past said first spring to a first adjustable spring seat engaging said second spring.

6. The shock absorber assembly as set forth in claim 5 further including a second fixed spring seat spaced axially from said first fixed spring seat.

7. The shock absorber assembly as set forth in claim 6 wherein said sleeve presents a cavity between said second fixed spring seat and said first adjustable spring seat.

8. The shock absorber assembly as set forth in claim 7 further including a second adjustable spring seat disposed in said cavity of said sleeve.

9. The shock absorber assembly as set forth in claim 8 further including a spindle interconnecting said actuator and said second adjustable spring seat for moving said second adjustable spring seat in an axial direction.

10. The shock absorber assembly as set forth in claim 9 wherein said second spring extends between said first and second adjustable spring seats for exerting a biasing force against said sleeve.

11. The shock absorber assembly as set forth in claim 1 wherein said first and second springs are disposed in said compression chamber.

12. The shock absorber assembly as set forth in claim 11 wherein said actuator is disposed in said rebound chamber.

13. The shock absorber assembly as set forth in claim 1 wherein said resilient disc is a rebound resilient disc disposed in said compression chamber.

14. The shock absorber as set forth in claim 13 further including a plurality of rebound resilient discs.

15. The shock absorber as set forth in claim 13 further including a compression resilient disc disposed in said rebound chamber and abutting said piston.

* * * * *